(12) United States Patent
Rivner et al.

(10) Patent No.: US 10,897,482 B2
(45) Date of Patent: Jan. 19, 2021

(54) METHOD, DEVICE, AND SYSTEM OF BACK-COLORING, FORWARD-COLORING, AND FRAUD DETECTION

(71) Applicant: BioCatch Ltd., Tel Aviv (IL)

(72) Inventors: Uri Rivner, Mazkeret Batya (IL); Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 14 days.

(21) Appl. No.: 16/510,919

(22) Filed: Jul. 14, 2019

(65) Prior Publication Data

US 2019/0342328 A1 Nov. 7, 2019

Related U.S. Application Data

(63) Continuation-in-part of application No. 16/416,222, filed on May 19, 2019, now Pat. No. 10,747,305,
(Continued)

(51) Int. Cl.
*G06F 7/04* (2006.01)
*H04L 29/06* (2006.01)
(Continued)

(52) U.S. Cl.
CPC .......... *H04L 63/1458* (2013.01); *G06F 3/041* (2013.01); *G06F 3/0488* (2013.01);
(Continued)

(58) Field of Classification Search
CPC ........... H04L 63/0876; H04L 2463/102; H04L 63/102; H04L 63/1425; G06F 21/552
See application file for complete search history.

(56) References Cited

U.S. PATENT DOCUMENTS 3,618,019 A 11/1971 Nemirovsky
3,699,517 A 10/1972 Dyche
(Continued)

FOREIGN PATENT DOCUMENTS

EP 2410450 A1 1/2012
EP 2477136 A1 7/2012
(Continued)

OTHER PUBLICATIONS

Faisal Alkhateeb et al., "Bank Web Sites Phishing Detection and Notification System Based on Semantic Web technologies", International Journal of Security and its Applications 6(4):53-66, Oct. 2012.
(Continued)

*Primary Examiner* — Gary S Gracia
(74) *Attorney, Agent, or Firm* — Eitan Mehulal Sadot

(57) ABSTRACT

System, device, and method for behaviorally validated link analysis, session linking, transaction linking, transaction back-coloring, transaction forward-coloring, fraud detection, and fraud mitigation. A method includes: receiving an indicator of a seed transaction known to be fraudulent; selecting, from a database of transactions, multiple transactions that share at least one common property with the seed transaction; generating a list of candidate fraudulent transactions; filtering the candidate fraudulent transactions, by applying a transaction filtering rule that is based on one or more behavioral characteristics; and generating a filtered list of candidate fraudulent transactions.

11 Claims, 1 Drawing Sheet

Related U.S. Application Data which is a continuation-in-part of application No. 15/708,155, filed on Sep. 19, 2017, now Pat. No. 10,298,614, which is a continuation-in-part of application No. 15/422,479, filed on Feb. 2, 2017, now Pat. No. 9,779,423, which is a continuation-in-part of application No. 15/276,803, filed on Sep. 27, 2016, now Pat. No. 10,055,560, which is a continuation-in-part of application No. 14/325,398, filed on Jul. 8, 2014, now Pat. No. 9,477,826, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 14/325,398 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, said application No. 15/422,479 is a continuation-in-part of application No. 15/210,221, filed on Jul. 14, 2016, now Pat. No. 9,674,218, which is a continuation of application No. 14/675,768, filed on Apr. 1, 2015, now Pat. No. 9,418,221, which is a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed on Apr. 4, 2013, now Pat. No. 9,069,942, said application No. 16/416,222 is a continuation-in-part of application No. 15/368,608, filed on Dec. 4, 2016, which is a continuation-in-part of application No. 15/001,259, filed on Jan. 20, 2016, now Pat. No. 9,541,995, which is a continuation of application No. 14/320,653, filed on Jul. 1, 2014, now Pat. No. 9,275,337, and a continuation-in-part of application No. 13/922,271, filed on Jun. 20, 2013, now Pat. No. 8,938,787, said application No. 15/368,608 is a continuation-in-part of application No. 14/727,873, filed on Jun. 2, 2015, now Pat. No. 9,526,006, and a continuation-in-part of application No. 15/360,291, filed on Nov. 23, 2016, now Pat. No. 9,747,436, which is a continuation-in-part of application No. 14/718,096, filed on May 21, 2015, now Pat. No. 9,531,701, application No. 16/510,919, filed on Jul. 14, 2019, which is a continuation-in-part of application No. 16/242,015, filed on Jan. 8, 2019, now Pat. No. 10,685,355, which is a continuation-in-part of application No. 16/057,825, filed on Aug. 8, 2018, now Pat. No. 10,523,680, which is a continuation-in-part of application No. 15/885,819, filed on Feb. 1, 2018, which is a continuation-in-part of application No. 15/368,608, filed on Dec. 4, 2016.

(60) Provisional application No. 62/312,140, filed on Mar. 23, 2016, provisional application No. 61/843,915, filed on Jul. 9, 2013, provisional application No. 61/417,479, filed on Nov. 29, 2010, provisional application No. 61/973,855, filed on Apr. 2, 2014, provisional application No. 62/621,600, filed on Jan. 25, 2018.

(51) Int. Cl.

| | | |
|---|---|---|
| *G06F 21/55* | (2013.01) | |
| *H04L 29/08* | (2006.01) | |
| *G06F 21/31* | (2013.01) | |
| *G06F 21/32* | (2013.01) | |
| *G06F 3/041* | (2006.01) | |
| *G06F 3/0488* | (2013.01) | |
| *G06Q 30/02* | (2012.01) | |
| *G06F 15/16* | (2006.01) | |
| *H04W 12/12* | (2009.01) | |

(52) U.S. Cl.
CPC ............ *G06F 21/31* (2013.01); *G06F 21/316* (2013.01); *G06F 21/32* (2013.01); *G06F 21/552* (2013.01); *G06F 21/554* (2013.01); *G06Q 30/0248* (2013.01); *G06Q 30/0277* (2013.01); *H04L 63/08* (2013.01); *H04L 63/10* (2013.01); *H04L 63/1408* (2013.01); *H04L 67/22* (2013.01); *H04L 67/306* (2013.01); *G06F 2221/2133* (2013.01); *H04L 2463/102* (2013.01); *H04L 2463/144* (2013.01); *H04W 12/12* (2013.01)

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,815,106 B1* | 10/2010 | McConnell ............ G06Q 30/02 235/380 |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,170,953 B1* | 5/2012 | Tullis ............... G06Q 20/4016 705/39 |

(56) References Cited

U.S. PATENT DOCUMENTS

| | | |
|---|---|---|
| 8,201,222 B2 | 6/2012 | Inoue |
| 8,244,211 B2* | 8/2012 | Clark ...................... G06F 21/34 |
| | | 455/411 |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,418,221 B2 | 8/2016 | Turgeman |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0149803 A1* | 8/2003 | Wilson ................... G08C 17/00 |
| | | 710/1 |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0128240 A1* | 7/2004 | Yusin .................... G06Q 20/10 |
| | | 705/39 |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1* | 10/2006 | Stanley .................. G06F 3/017 |
| | | 345/156 |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091453 A1* | 4/2008 | Meehan ........... G06Q 20/40145 |
| | | 705/317 |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2008/0319841 A1* | 12/2008 | Oliver ................ G06Q 30/0248 |
| | | 705/14.47 |
| 2009/0037983 A1 | 2/2009 | Chiruvolu |
| 2009/0038010 A1 | 2/2009 | Ma |
| 2009/0089879 A1 | 4/2009 | Wang |
| 2009/0094311 A1 | 4/2009 | Awadallah |
| 2009/0132395 A1 | 5/2009 | Lam |

(56) References Cited

U.S. PATENT DOCUMENTS

| | | |
|---|---|---|
| 2009/0157792 A1 | 6/2009 | Fiatal |
| 2009/0172551 A1 | 7/2009 | Kane |
| 2009/0177562 A1* | 7/2009 | Peace ............... G06Q 20/40 705/30 |
| 2009/0189736 A1 | 7/2009 | Hayashi |
| 2009/0199296 A1 | 8/2009 | Xie |
| 2009/0203355 A1* | 8/2009 | Clark ............... G06F 21/32 455/411 |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0299967 A1* | 12/2009 | Li ............... G06Q 30/02 |
| 2009/0300589 A1* | 12/2009 | Watters ............... G06Q 40/00 717/140 |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0097324 A1* | 4/2010 | Anson ............... G06F 21/36 345/173 |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0203876 A1* | 8/2010 | Krishnaswamy ..... H04L 67/025 455/418 |
| 2010/0225443 A1* | 9/2010 | Bayram ............... G06F 21/316 340/5.83 |
| 2010/0245553 A1* | 9/2010 | Schuler ............... G06K 9/00006 348/77 |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0055077 A1* | 3/2011 | French ............... G06Q 20/04 705/39 |
| 2011/0063211 A1 | 3/2011 | Hoerl |
| 2011/0065504 A1 | 3/2011 | Dugan |
| 2011/0066682 A1* | 3/2011 | Aldunate ............... H04L 67/36 709/204 |
| 2011/0102570 A1 | 5/2011 | Wilf |
| 2011/0105103 A1* | 5/2011 | Ullrich ............... G06F 3/038 455/420 |
| 2011/0105859 A1 | 5/2011 | Popovic |
| 2011/0113388 A1 | 5/2011 | Eisen |
| 2011/0119370 A1* | 5/2011 | Huang ............... H04L 43/14 709/224 |
| 2011/0154273 A1 | 6/2011 | Aburada |
| 2011/0154497 A1* | 6/2011 | Bailey, Jr. ............ G06F 21/577 726/25 |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0196791 A1* | 8/2011 | Dominguez ........... G06Q 20/40 705/44 |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0286730 A1* | 11/2011 | Gallagher ............... G03B 17/00 396/53 |
| 2011/0300831 A1* | 12/2011 | Chin ............... G06F 1/3203 455/411 |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0072982 A1* | 3/2012 | Ranganathan ........ G06F 21/552 726/22 |
| 2012/0096555 A1 | 4/2012 | Mahaffey |
| 2012/0101930 A1* | 4/2012 | Li ............... G06Q 40/02 705/35 |
| 2012/0102551 A1 | 4/2012 | Bidare |
| 2012/0113061 A1 | 5/2012 | Ikeda |
| 2012/0123932 A1* | 5/2012 | LeCuyer ............... G06Q 40/06 705/39 |
| 2012/0124662 A1 | 5/2012 | Baca |
| 2012/0133055 A1 | 5/2012 | MacHida |
| 2012/0151044 A1* | 6/2012 | Luna ............... H04L 67/2852 709/224 |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1* | 6/2012 | Shi ............... G06F 21/32 726/2 |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0239557 A1* | 9/2012 | Weinflash ............ G06Q 20/4016 705/39 |
| 2012/0246737 A1 | 9/2012 | Paxton |
| 2012/0252410 A1 | 10/2012 | Williams |
| 2012/0278804 A1 | 11/2012 | Narayanasamy |
| 2012/0278886 A1* | 11/2012 | Luna ............... G06F 21/552 726/22 |
| 2012/0284380 A1 | 11/2012 | Anderson |
| 2012/0297476 A1* | 11/2012 | Zeljkovic ............... H04L 63/18 726/22 |
| 2013/0018796 A1* | 1/2013 | Kolhatkar ............... G06Q 20/28 705/44 |
| 2013/0024239 A1 | 1/2013 | Baker |
| 2013/0036416 A1 | 2/2013 | Raju |
| 2013/0061169 A1* | 3/2013 | Pearcy ............... G06F 21/50 715/788 |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0111586 A1 | 5/2013 | Jackson |
| 2013/0133055 A1 | 5/2013 | Ali |
| 2013/0135218 A1* | 5/2013 | Jain ............... G06F 3/0488 345/173 |
| 2013/0139248 A1 | 5/2013 | Rhee |

(56) References Cited

U.S. PATENT DOCUMENTS

| | | | |
|---|---|---|---|
| 2013/0154999 A1 | 6/2013 | Guard | |
| 2013/0162603 A1 | 6/2013 | Peng | |
| 2013/0167212 A1 | 6/2013 | Azar | |
| 2013/0173737 A1* | 7/2013 | Liu | H04N 21/6377 709/213 |
| 2013/0212674 A1 | 8/2013 | Boger | |
| 2013/0226992 A1* | 8/2013 | Bapst | H04L 67/10 709/203 |
| 2013/0237272 A1* | 9/2013 | Prasad | H01Q 3/26 455/517 |
| 2013/0239195 A1 | 9/2013 | Turgeman | |
| 2013/0239206 A1 | 9/2013 | Draluk | |
| 2013/0282637 A1 | 10/2013 | Costigan | |
| 2013/0288647 A1 | 10/2013 | Turgeman | |
| 2013/0305357 A1 | 11/2013 | Ayyagari | |
| 2013/0312097 A1 | 11/2013 | Turnbull | |
| 2013/0335349 A1 | 12/2013 | Ferren | |
| 2013/0346309 A1* | 12/2013 | Giori | G06Q 20/10 705/43 |
| 2014/0033317 A1 | 1/2014 | Barber | |
| 2014/0041020 A1 | 2/2014 | Zhao | |
| 2014/0078061 A1 | 3/2014 | Simons | |
| 2014/0078193 A1 | 3/2014 | Bamhoefer | |
| 2014/0082369 A1 | 3/2014 | Waclawsky | |
| 2014/0111451 A1 | 4/2014 | Park | |
| 2014/0114843 A1* | 4/2014 | Klein | G06Q 20/4016 705/39 |
| 2014/0118520 A1 | 5/2014 | Slaby | |
| 2014/0123275 A1* | 5/2014 | Azar | G06K 9/00288 726/19 |
| 2014/0143304 A1 | 5/2014 | Hegarty | |
| 2014/0168093 A1 | 6/2014 | Lawrence | |
| 2014/0196119 A1 | 7/2014 | Hill | |
| 2014/0200953 A1 | 7/2014 | Mun | |
| 2014/0244499 A1* | 8/2014 | Gruner | G06Q 20/4014 705/42 |
| 2014/0250538 A1 | 9/2014 | Rapaport | |
| 2014/0259130 A1 | 9/2014 | Li | |
| 2014/0270571 A1 | 9/2014 | Dwan | |
| 2014/0283059 A1 | 9/2014 | Sambamurthy | |
| 2014/0283068 A1* | 9/2014 | Call | G06F 21/566 726/23 |
| 2014/0317028 A1 | 10/2014 | Turgeman | |
| 2014/0317726 A1 | 10/2014 | Turgeman | |
| 2014/0317734 A1 | 10/2014 | Valencia | |
| 2014/0317744 A1 | 10/2014 | Turgeman | |
| 2014/0325223 A1 | 10/2014 | Turgeman | |
| 2014/0325645 A1 | 10/2014 | Turgeman | |
| 2014/0325646 A1 | 10/2014 | Turgeman | |
| 2014/0325682 A1 | 10/2014 | Turgeman | |
| 2014/0337786 A1 | 11/2014 | Luo | |
| 2014/0344927 A1 | 11/2014 | Turgeman | |
| 2015/0002479 A1 | 1/2015 | Kawamura | |
| 2015/0012920 A1 | 1/2015 | De Santis | |
| 2015/0062078 A1 | 3/2015 | Christman | |
| 2015/0081549 A1* | 3/2015 | Kimberg | G06Q 20/4016 705/44 |
| 2015/0091858 A1 | 4/2015 | Rosenberg | |
| 2015/0094030 A1 | 4/2015 | Turgeman | |
| 2015/0101031 A1 | 4/2015 | Harjanto | |
| 2015/0146945 A1 | 5/2015 | Han | |
| 2015/0205944 A1 | 7/2015 | Turgeman | |
| 2015/0205955 A1 | 7/2015 | Turgeman | |
| 2015/0205957 A1 | 7/2015 | Turgeman | |
| 2015/0205958 A1 | 7/2015 | Turgeman | |
| 2015/0212843 A1 | 7/2015 | Turgeman | |
| 2015/0213244 A1 | 7/2015 | Lymberopoulos | |
| 2015/0213246 A1 | 7/2015 | Turgeman | |
| 2015/0213251 A1 | 7/2015 | Turgeman | |
| 2015/0256528 A1 | 9/2015 | Turgeman | |
| 2015/0256556 A1 | 9/2015 | Kaminsky | |
| 2015/0264572 A1 | 9/2015 | Turgeman | |
| 2015/0268768 A1 | 9/2015 | Woodhull | |
| 2015/0279155 A1* | 10/2015 | Chun | G07F 17/3234 463/25 |
| 2015/0310196 A1 | 10/2015 | Turgeman | |
| 2015/0348038 A1* | 12/2015 | Femrite | G06Q 20/4014 705/44 |
| 2016/0006800 A1 | 1/2016 | Summers | |
| 2016/0034673 A1 | 2/2016 | Chandra | |
| 2016/0042164 A1 | 2/2016 | Goldsmith | |
| 2016/0048937 A1* | 2/2016 | Mathura | G06Q 10/0635 705/30 |
| 2016/0077620 A1 | 3/2016 | Choi | |
| 2016/0109969 A1 | 4/2016 | Keating | |
| 2016/0132105 A1 | 5/2016 | Turgeman | |
| 2016/0155126 A1* | 6/2016 | D'uva | G06Q 20/40145 705/44 |
| 2016/0164905 A1 | 6/2016 | Pinney Wood | |
| 2016/0164906 A1 | 6/2016 | Pinney Wood | |
| 2016/0174044 A1 | 6/2016 | Jones | |
| 2016/0179245 A1 | 6/2016 | Johansson | |
| 2016/0191237 A1 | 6/2016 | Roth | |
| 2016/0196414 A1 | 7/2016 | Stuntebeck | |
| 2016/0197918 A1 | 7/2016 | Turgeman | |
| 2016/0209948 A1 | 7/2016 | Tulbert | |
| 2016/0226865 A1 | 8/2016 | Chen | |
| 2016/0294837 A1 | 10/2016 | Turgeman | |
| 2016/0300054 A1 | 10/2016 | Turgeman | |
| 2016/0306974 A1 | 10/2016 | Turgeman | |
| 2016/0307191 A1 | 10/2016 | Turgeman | |
| 2016/0307201 A1 | 10/2016 | Turgeman | |
| 2016/0321445 A1 | 11/2016 | Turgeman | |
| 2016/0321689 A1 | 11/2016 | Turgeman | |
| 2016/0342826 A1 | 11/2016 | Apostolos | |
| 2016/0344783 A1 | 11/2016 | Kushimoto | |
| 2016/0364138 A1 | 12/2016 | Luo | |
| 2016/0366177 A1 | 12/2016 | Turgeman | |
| 2016/0371476 A1 | 12/2016 | Turgeman | |
| 2017/0011217 A1 | 1/2017 | Turgeman | |
| 2017/0012988 A1 | 1/2017 | Turgeman | |
| 2017/0017781 A1 | 1/2017 | Turgeman | |
| 2017/0032114 A1 | 2/2017 | Turgeman | |
| 2017/0034210 A1 | 2/2017 | Talmor | |
| 2017/0048272 A1 | 2/2017 | Yamamura | |
| 2017/0054702 A1 | 2/2017 | Turgeman | |
| 2017/0076089 A1 | 3/2017 | Turgeman | |
| 2017/0085587 A1 | 3/2017 | Turgeman | |
| 2017/0090418 A1 | 3/2017 | Tsang | |
| 2017/0091450 A1 | 3/2017 | Turgeman | |
| 2017/0126735 A1 | 5/2017 | Turgeman | |
| 2017/0127197 A1* | 5/2017 | Mulder | G06F 3/165 |
| 2017/0140279 A1 | 5/2017 | Turgeman | |
| 2017/0149958 A1 | 5/2017 | Xian | |
| 2017/0154366 A1 | 6/2017 | Turgeman | |
| 2017/0193526 A1 | 7/2017 | Turgeman | |
| 2017/0195354 A1 | 7/2017 | Kesin | |
| 2017/0195356 A1 | 7/2017 | Turgeman | |
| 2017/0221064 A1 | 8/2017 | Turgeman | |
| 2017/0302340 A1 | 10/2017 | Berlin | |
| 2017/0364919 A1 | 12/2017 | Ranganath | |
| 2018/0012227 A1 | 1/2018 | Tunnell | |
| 2018/0034850 A1 | 2/2018 | Turgeman | |
| 2018/0095596 A1 | 4/2018 | Turgeman | |
| 2018/0103047 A1 | 4/2018 | Turgeman | |
| 2018/0107836 A1 | 4/2018 | Boger | |
| 2018/0115899 A1 | 4/2018 | Kedem | |
| 2018/0121640 A1 | 5/2018 | Turgeman | |
| 2018/0160309 A1 | 6/2018 | Turgeman | |
| 2018/0302425 A1* | 10/2018 | Esman, Sr. | H04L 63/1425 |
| 2018/0314816 A1 | 11/2018 | Turgeman | |
| 2018/0349583 A1 | 12/2018 | Turgeman | |
| 2018/0350144 A1 | 12/2018 | Rathod | |
| 2018/0351959 A1 | 12/2018 | Turgeman | |
| 2018/0373780 A1* | 12/2018 | Pascarella | G06F 16/287 |
| 2019/0028497 A1 | 1/2019 | Karabchevsky | |
| 2019/0057200 A1 | 2/2019 | Sabag | |
| 2019/0121956 A1 | 4/2019 | Turgeman | |
| 2019/0156034 A1 | 5/2019 | Kedem | |

(56) References Cited

U.S. PATENT DOCUMENTS

| | | |
|---|---|---|
| 2019/0158535 A1 | 5/2019 | Kedem |
| 2019/0220863 A1 | 7/2019 | Novick |

FOREIGN PATENT DOCUMENTS

| | | |
|---|---|---|
| EP | 2541452 A1 | 1/2013 |
| EP | 2610776 A2 | 7/2013 |
| EP | 2646904 B1 | 8/2018 |
| EP | 3019991 B1 | 2/2019 |
| ES | 2338092 A1 | 5/2010 |
| WO | 2005099166 A2 | 10/2005 |
| WO | 2007146437 A2 | 12/2007 |
| WO | 2012073233 A1 | 6/2012 |
| WO | 2015/127253 A1 | 8/2015 |

OTHER PUBLICATIONS

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecture for Intrusion Detection.", 2003, Proc. Network and Distributed Systems Security Symp., The Internet Society, pp. 191-206.

Spafford et al., "Software Forensics: Can We Track Code to its Authors?", Feb. 1992, Computer Science Technical Report, Purdue e-Pubs, Report No. CSD-TR-92-010.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Zheng et al., "An Efficient User Verification System via Mouse Movements", Oct. 17-21, 2011, CCS' 11, Chicago, Illinois.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Georgia Frantzeskou et al., "Identifying Authorship by Byte-Level N-Grams: The source Code Author Profile (SCAP) Method", Spring 2007, International Journal of Digital Evidence, vol. 6, issue 1.

Franklin et al., "Remote Detection of Virtual Machine Monitors with Fuzzy benchmarking", ACM SIGOPS Operating Systems Review, V42, Issue 3, Apr. 2008.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Communication from the European Patent Office (EPO) in EP 14814408, dated Oct. 15, 2019.

Bassam Sayed, "A Static Authentication Framework Based on Mouse Gesture Dynamics", Helwan University, 2003.

Communication from the European Patent Office (EPO) in EP 17739666, dated Jun. 17, 2020.

Communication from the European Patent Office (EPO) in EP 17777357, dated Jul. 23, 2020.

International Search Report (ISR) in PCT/IL2020/050724, dated Sep. 7, 2020.

Written Opinion of the International Searching Authority in PCT/IL2020/050724, dated Sep. 7, 2020.

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication Via Multi-Modal Fusion", Thesis, 2013, Air Force Insitute of Technology.

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Ben Hansen, "The Blur Busters Mouse Guide", dated Feb. 1, 2014; printed from the Internet on Aug. 5, 2019 from: https://www.blurbusters.com/faq/mouse-guide/.

Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

\* cited by examiner

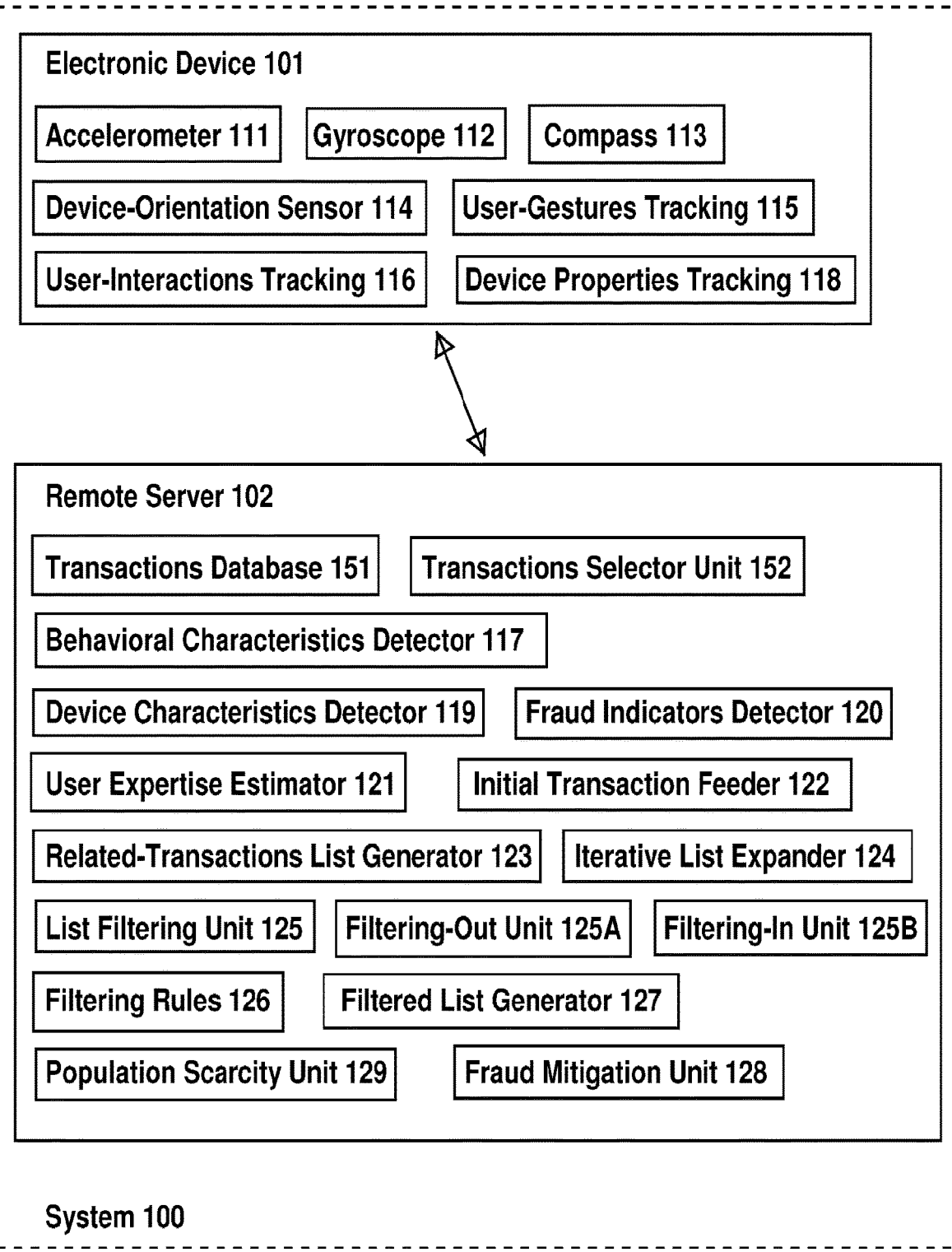

METHOD, DEVICE, AND SYSTEM OF BACK-COLORING, FORWARD-COLORING, AND FRAUD DETECTION

CROSS-REFERENCE TO RELATED APPLICATIONS

This patent application is a Continuation-in-Part (CIP) of U.S. Ser. No. 16/416,222, filed on May 19, 2019, which is hereby incorporated by reference in its entirety.

The above-mentioned U.S. Ser. No. 16/416,222 is a Continuation-in-Part (CIP) of U.S. Ser. No. 15/708,155, filed on Sep. 19, 2017, now patent number U.S. Pat. No. 10,298,614, which is hereby incorporated by reference in its entirety.

The above-mentioned U.S. Ser. No. 15/708,155 is a Continuation-In-Part (CIP) of U.S. Ser. No. 15/422,479, filed on Feb. 2, 2017, now patent number U.S. Pat. No. 9,779,423, which is hereby incorporated by reference in its entirety.

The above-mentioned U.S. Ser. No. 15/422,479 claims priority and benefit from U.S. 62/312,140, filed on Mar. 23, 2016, which is hereby incorporated by reference in its entirety.

The above-mentioned U.S. Ser. No. 15/422,479 is also a Continuation-in-Part (CIP) of U.S. Ser. No. 15/276,803, filed Sep. 27, 2016, now patent number U.S. Pat. No. 10,055,560, which is hereby incorporated by reference in its entirety.

The above-mentioned U.S. Ser. No. 15/276,803 is a Continuation-in-Part (CIP) of U.S. Ser. No. 14/325,398, filed on Jul. 8, 2014, now patent number U.S. Pat. No. 9,477,826, which is hereby incorporated by reference in its entirety.

The above-mentioned U.S. Ser. No. 14/325,398 claims priority and benefit from U.S. 61/843,915, filed on Jul. 9, 2013, which is hereby incorporated by reference in its entirety.

The above-mentioned U.S. Ser. No. 14/325,398 is a Continuation-in-Part (CIP) of U.S. Ser. No. 13/922,271, filed on Jun. 20, 2013, now U.S. Pat. No. 8,938,787, which is hereby incorporated by reference in its entirety.

The above-mentioned U.S. Ser. No. 14/325,398 is a Continuation-in-Part (CIP) of U.S. Ser. No. 13/877,676, filed on Apr. 4, 2013, now patent number U.S. Pat. No. 9,069,942; which was a National Phase of PCT International Application number PCT/IL2011/000907, filed on Nov. 29, 2011; which claimed priority and benefit from U.S. 61/417,479, filed on Nov. 29, 2010; all of which are hereby incorporated by reference in their entirety.

The above-mentioned U.S. Ser. No. 14/325,398 is a Continuation-in-Part (CIP) of U.S. Ser. No. 14/320,653, filed on Jul. 1, 2014, now patent number U.S. Pat. No. 9,275,337, which is hereby incorporated by reference in its entirety.

The above-mentioned U.S. Ser. No. 14/325,398 is a Continuation-in-Part (CIP) of U.S. Ser. No. 14/320,656, filed on Jul. 1, 2014, now patent number U.S. Pat. No. 9,665,703, which is hereby incorporated by reference in its entirety.

The above-mentioned U.S. Ser. No. 15/422,479 is also a Continuation-in-Part (CIP) of U.S. Ser. No. 15/210,221, filed Jul. 14, 2016, now patent number U.S. Pat. No. 9,674,218, which is hereby incorporated by reference in its entirety.

The above-mentioned U.S. Ser. No. 15/210,221 is a Continuation of U.S. Ser. No. 14/675,768, filed on Apr. 1, 2015, now patent number U.S. Pat. No. 9,418,221, which is hereby incorporated by reference in its entirety.

The above-mentioned U.S. Ser. No. 14/675,768 claims priority and benefit from U.S. 61/973,855, filed on Apr. 2, 2014, which is hereby incorporated by reference in its entirety.

The above-mentioned U.S. Ser. No. 14/675,768 is a Continuation-in-Part (CIP) of U.S. Ser. No. 14/566,723, filed on Dec. 11, 2014, now patent number U.S. Pat. No. 9,071,969; which is a Continuation of U.S. Ser. No. 13/922,271, filed on Jun. 20, 2013, now patent number U.S. Pat. No. 8,938,787; which is a Continuation-in-Part (CIP) of U.S. Ser. No. 13/877,676, filed on Apr. 4, 2013, now patent number U.S. Pat. No. 9,069,942; which is a National Stage of PCT International Application number PCT/IL2011/000907, having an International Filing Date of Nov. 29, 2011; which claims priority and benefit from U.S. 61/417,479, filed on Nov. 29, 2010; all of which are hereby incorporated by reference in their entirety.

The above-mentioned U.S. Ser. No. 16/416,222 is is also a Continuation-in-Part (CIP) of U.S. Ser. No. 15/368,608, filed on Dec. 4, 2016, which is hereby incorporated by reference in its entirety.

The above-mentioned U.S. Ser. No. 15/368,608 is a Continuation-in-Part (CIP) of U.S. Ser. No. 15/001,259, filed on Jan. 20, 2016, now patent number U.S. Pat. No. 9,541,995; which is a Continuation of U.S. Ser. No. 14/320,653, filed on Jul. 1, 2014, now patent number U.S. Pat. No. 9,275,337; all of which are hereby incorporated by reference in their entirety.

The above-mentioned U.S. Ser. No. 14/320,653 claims priority and benefit from U.S. 61/843,915, filed on Jul. 9, 2013, which is hereby incorporated by reference in its entirety.

The above-mentioned U.S. Ser. No. 14/320,653 is also a Continuation-in-Part (CIP) of U.S. Ser. No. 13/922,271, filed on Jun. 20, 2013, now patent number U.S. Pat. No. 8,938,787, which is hereby incorporated by reference in its entirety.

The above-mentioned U.S. Ser. No. 14/320,653 is also a Continuation-in-Part (CIP) of U.S. Ser. No. 13/877,676, filed on Apr. 4, 2013, now patent number U.S. Pat. No. 9,069,942, which was a National Phase of PCT International Application number PCT/IL2011/000907, filed on Nov. 29, 2011, which claimed priority and benefit from U.S. 61/417,479, filed on Nov. 29, 2010. All of the above-mentioned patent applications are hereby incorporated by reference in their entirety.

The above-mentioned U.S. Ser. No. 15/368,608 is also a Continuation-in-Part (CIP) of U.S. patent application Ser. No. 14/727,873, filed on Jun. 2, 2015, now U.S. Pat. No. 9,526,006, which is hereby incorporated by reference in its entirety.

The above-mentioned U.S. Ser. No. 15/368,608 is also a Continuation-in-Part (CIP) of U.S. Ser. No. 15/360,291, filed on Nov. 23, 2016, now patent number U.S. Pat. No. 9,747,436; which is a Continuation-in-Part (CIP) of U.S. Ser. No. 14/718,096, filed on May 21, 2015, now patent number U.S. Pat. No. 9,531,701; all of which are hereby incorporated by reference in their entirety.

This patent application is also a Continuation-in-Part (CIP) of U.S. Ser. No. 16/242,015, filed on Jan. 8, 2019, which is hereby incorporated by reference in its entirety.

The above-mentioned U.S. Ser. No. 16/242,015 claims benefit and priority from U.S. 62/621,600, filed on Jan. 25, 2018, which is hereby incorporated by reference in its entirety.

The above-mentioned U.S. Ser. No. 16/242,015 is a Continuation-in-Part (CIP) of U.S. Ser. No. 16/057,825, filed on Aug. 8, 2018, which is hereby incorporated by reference in its entirety. This patent application claims priority and/or benefit from all the patent applications from which U.S. Ser. No. 16/057,825 had directly or indirectly claimed priority and/or benefit.

The above-mentioned U.S. Ser. No. 16/242,015 is also a Continuation-in-Part (CIP) of U.S. Ser. No. 15/885,819, filed on Feb. 1, 2018, which is hereby incorporated by reference in its entirety. This patent application claims priority and/or benefit from all the patent applications from which U.S. Ser. No. 15/885,819 had directly or indirectly claimed priority and/or benefit.

The above-mentioned U.S. Ser. No. 16/242,015 is also a Continuation-in-Part (CIP) of U.S. Ser. No. 15/368,608, filed on Dec. 4, 2016, which is hereby incorporated by reference in its entirety. This patent application claims priority and/or benefit from all the patent applications from which U.S. Ser. No. 15/368,608 had directly or indirectly claimed priority and/or benefit.

FIELD

The present invention is related to cyber security.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, capturing photographs and videos, engaging in a video conference or a chat session, playing games, or the like.

Some activities may be privileged, or may require authentication of the user in order to ensure that only the authorized user engages in the activity. For example, a user may be required to correctly enter his username and his password in order to access his email account, or in order to access his online banking interface or website.

SUMMARY

The present invention may comprise systems, devices, and methods for behaviorally validated link analysis, session linking, transaction linking, transaction back-coloring, transaction forward-coloring, fraud detection, and fraud mitigation. For example, a method comprises: receiving an indicator of a seed transaction known to be fraudulent; selecting, from a database of transactions, multiple transactions that share at least one common property with the seed transaction (for example, same IP address, same geo-location venue, same end-user device, same "cookie" data-item, same MAC address, same beneficiary name or address, same shipping name or address, same billing name or address, or the like); generating a list of candidate fraudulent transactions; filtering the candidate fraudulent transactions, by applying a transaction filtering rule that is based on one or more behavioral characteristics and particularly based on negative (or fraud-related) behavioral characteristics (for example, the user is not familiar with the data he enters; the user performs copy-and-paste of his first name or his last name; or the like); and generating a filtered list of candidate fraudulent transactions. Then, the method continues to iteratively link such candidate fraudulent transactions with other transactions sharing a different property (for example, same device parameters), using filtering rule(s) that are based on one or more (e.g., negative) behavioral characteristics; and continues to iteratively expand the list of linked entities or transactions or sessions, while constantly validating that the linked entities or transactions or sessions are likely fraudulent as they all have one or more negative (e.g., fraud-related) behavioral characteristics.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF THE PRESENT INVENTION

The present invention provides systems, devices, and methods for behaviorally validated link analysis, session linking, transaction linking, transaction back-coloring, transaction forward-coloring, fraud detection, and fraud mitigation.

In accordance with the present invention, in forensic investigations, fraud investigations and criminal investigations, link analysis or "back coloring" takes a known bad case (e.g., an Initial Transaction or a Seed Transaction that is known or pre-determined to be fraudulent), and performs a recursive or iterative process in which additional sessions or transactions become suspects or fraud-candidates by way of linking them to the Initial Transaction based on one or more similar characteristics; such as, utilization of the same end-user device to perform the transaction, utilization of the same Internet Protocol (IP) address, or the like. Each linked session or transaction can then produce additional suspects or fraud-candidates, similarly connected to that session's (or transaction's) linking entities. The result is an exponentially growing tree or web of linked sessions or linked transaction, that are suspects or fraud-candidates as all stemming from or related to (directly, or indirectly via N degrees of separation) the same Initial Transaction.

The Applicants have realized that link expansion using elements such as utilization of the same device or the same IP address, cause numerous "false positive" errors. For example, in many fraud cases, a shared device is used by the criminal, such as, a computer station at a Public Library or at an Internet Cafe. Legitimate or "genuine" users also utilize the same device, before the criminal and after the criminal, to perform legitimate non-fraudulent transactions, which may be incorrectly "colored" as fraud-candidates (e.g., back-colored if occurring before the Initial Transaction; or forward-colored if occurring after the Initial Transaction), even though they originated from legitimate users who just happened to utilize the same public computer that a criminal had also utilized for the Initial Transaction. The Applicants have realized that this may limit the number of iterations used to expand the tree of fraud candidates. For example, a candidate fraud transaction that is several times removed from the Initial Transaction, may often belong to a legitimate user and may be non-related at all to the criminal responsible for the Initial Transaction.

The present invention provides systems and methods enabling a unique capability for Behaviorally Validated' link analysis, transactions analysis, transaction relatedness generation, transaction coloring, back-coloring, forward-coloring, fraud detection and/or fraud mitigation. The system of the present invention may expand the related-transactions tree (or web) using common characteristics (e.g., same device, same IP address, same payee or beneficiary, same shipping address, or the like), while dramatically reducing the risk of incorrectly flagging a legitimate transaction that was performed by a legitimate user who happened to share the same resource (e.g., public computer; public Wi-Fi network; or the like) that was also utilized by the criminal during his fraudulent Initial Transaction. and good people is dramatically reduced because we also verify the session using behavioral biometric analysis that shows criminal behavior signs. If it doesn't show criminal behavior signs it won't enter the link analysis and won't trigger additional links.

The system and method of the present invention significantly improve the ability to create a powerful link analysis and to generate a tree or web of related transactions while reducing the number or rate of "false positive" errors; thereby preventing a link analysis or back-coloring process that rapidly becomes infested with "false positive" errors due to a shared resource, such as, the criminal performed the Initial Transaction using a free Wi-Fi network at a local coffeeshop, or via a desktop computer at a public library or an Internet cafe, which was also utilized by hundreds of other users on the same month to perform legitimate transactions. The Applicants have realized that once such a "shared resource" is utilized for transaction linking and transaction coloring, legitimate users and legitimate transaction are rapidly added (erroneously) to the tree or web of fraud-candidate linked transactions, and the "false positive" errors grow exponentially, and the quality of the generated list or tree or web of fraud candidates degrades dramatically.

The present invention may validate or filter-in or maintain transactions that exhibit behavioral characteristic(s) which (i) correspond to criminal or fraudulent behavior in general, and/or (ii) match the behavioral characteristics extracted from the Initial Transactions performed by the original criminal. Typically, the utilized features are very rare in the total population, thereby reducing the chance of incorrectly linking "by accident" legitimate transactions of legitimate users; thereby enabling the system, through its behavioral validation, to iteratively and continuously expand the list or tree or web or related fraud-candidate transactions, with little or no risk of "incriminating" legitimate users or of flagging legitimate transactions.

The present invention provides devices, system, and methods of automated and improved transaction coloring, back-coloring and forward-coloring, as well as session linking and transaction linking, particularly useful in forensic investigations, law enforcement investigations, fraud detection, cyber-security enforcement, cyber-security investigations, and other fields.

For example, a computerized system of an entity, such as a bank, an online retailer, an online merchant, or the like, may perform an initial detection that a particular transaction ("the Initial Transaction") is or was fraudulent. The initial detection may be based on manual or human analysis of data or meta-data; and/or may be based on manual and/or human indications or messages (e.g., a credit card customer submitting a fraud report or disputing a transaction as fraudulent); and/or may be automatic or semi-automatic (e.g., a banking system detects a new wire transfer towards a beneficiary that was already determined, in the past, to be a fraudulent or criminal destination; a retailer system detecting a new purchase of a product with a shipping address that is already known to that system as fraud-related).

Accordingly, the entire record that is related to such Initial Transaction, is flagged or marked or tagged as fraud-related. The system now proceeds to perform back-coloring and/or session linking, based on such Initial Transaction. For example, the system determines that the Initial Transaction was performed from a particular Internet Protocol (IP) address that was logged by the system during the transaction submission, and/or from a particular geographic location (e.g., based on geo-location of the logged IP address). The system now searches its database of all transactions, that were performed before and/or after the Initial Transaction, and which originated or were performed from the same IP address and/or the same geo-location; as such additional transactions are candidates of being fraud-related or fraudulent. Similarly, the system may search from transactions that were performed via the same web browser (e.g., relying on a "cookie" data-item of that browser; or relying on a unique browser-signature reflected in the types of fonts installed on the computer; or the like).

However, the Applicants have realized that such simplified process of back-coloring or session linking may be problematic, and may result in a significant number of "false positives" or erroneous transactions. For example, the Initial Transaction is often performed by a criminal at a computer station located at an Internet café or at a public library, and such computer station is later used by hundreds of other non-criminal persons to perform thousands of non-fraudulent transactions. An attempt to back-color or forward-color or session-link, between records or transactions or sessions, based on such data, may thus lead to hundreds of "false positive" transactions or records which actually belong to (or, are associated with) legitimate users and/or legitimated (non-fraudulent) transactions.

Similarly, the Applicants have realized that often, the Initial Transaction is performed by a criminal using his own laptop computer but being located at a venue which offers free public Internet connection over Wi-Fi, such as, a coffee shop or a restaurant that offers free Wi-Fi based Internet access to customers or visitors. Therefore, geo-location of the Initial Transaction may pin-point to a particular venue or location, in which the criminal indeed operated during the Initial Transaction, but which was also populated and used by hundreds of other, legitimate, users who performed hundreds of legitimate transactions from the same venue or location.

Accordingly, the Applicants have realized that it does not suffice to link between or among sessions or transactions, based solely on identification of the same IP address and/or identification of the same geo-location and/or identification that the same computer station (or other specific computing device) was utilized; as such methods of session linking and/or back-coloring and/or forward-coloring rapidly yields hundreds or thousands of "false positive" detections which are marked as fraudulent or as fraud-candidates but actually belong to legitimate non-fraudulent transactions.

The Applicants have further realized that the problem intensifies once the process is performed iterative to construct a Tree of second-order and third-order and Nth-order linkage among sessions or transactions or records. For example, an Initial Transaction was detected to be fraudulent, but was performed by a criminal via a computer in an Internet cafe. In that month, 500 other (legitimate) users have also utilized that same computer in that same Internet café, to perform 500 other transactions, all of them are now marked or tagged or flagged as fraud-candidates. Then, the system may proceed to review or analyze the data or meta-data of those 500 other transactions, in order to perform "second order" coloring or session-linking: for example, by flagging or tagging as fraudulent, any other transaction in which the product was shipped to the same address as one of those 500 transactions, or any other transaction in which a wire transfer was made to a beneficiary who is the same as one of those 500 transactions. This "second order" analysis, or second iteration of the analysis, may thus yield thousands of flagged transactions, which are erroneous or "false positives".

For example, a criminal used a Public Library computer to perform a fraudulent purchase at an online retailer. Based on the IP address and/or geo-location, 600 other purchases that 600 other legitimate users have performed via the same Public Library computer, are also tagged or flagged or marked (incorrectly) as possibly fraudulent. Then, the Shipping Addresses of those 600 fraud-candidate transactions, are utilized to further flag or mark or tag Thousands of other transactions, that were performed via other computers, at the same retailer and shipped products to the same shipping addresses; thereby creating a "second order" group of thousands of transactions that are flagged as fraudulent. Then, in a "third order" analysis or a third iteration, the IP addresses associated with those thousands of flagged transactions, are further utilized by the system to tag tens-of-thousands of transactions that originated from the same IP address; although they are all legitimate transactions, that hundreds of users performed from their home, and that were only linked to the Initial Transaction because those hundreds of legitimate users have utilized one time the same Public Library computer that the original criminal utilized.

The Applicants have realized that such methods of back-coloring or forward-coloring or session-linking or session clustering or transaction clustering, grow rapidly and exponentially towards numerous amount of flagged transactions; which, in turn, are mostly and dominantly "false positive" flags, and which are virtually impossible to be manually reviewed (or acted upon) by a fraud investigator or by law enforcement agency.

The Applicants have further realized that such exponential growth of flagged transactions, may lead to adverse effects to thousands of legitimate users; whose accounts (e.g., bank account, credit card account, user account at an online retailer) may become frozen or on-hold or suspended or blocked due to such erroneous session-linking.

The present invention provides unique methods, devices, and systems that perform Behaviorally Validated link analysis and/or Behaviorally Validated linkage analysis and/or Behaviorally Validated back-coloring of transactions and/or Behaviorally Validated forward-coloring of transactions and/or Behaviorally Validated session linking and/or Behaviorally Validated transaction linking.

In a first example, a transaction that is related to the Initial Transaction (directly in the first order, or in an Nth order), is indeed flagged as fraudulent, only if the two transactions (the Initial Transaction, and the Related Transaction) exhibit the same behavioral biometric characteristics. For example, criminal user Adam utilized the computer at the Public Library to perform transaction P0. Then, 50 other users utilized the same computer at the same Public Library to perform transactions numbered P1 through P50. Then, the same criminal user Adam utilized again the same computer at that Public Library to perform another fraudulent transaction P51. The system of the present invention tracks, monitors and analyzes the user interactions and/or user gestures of all those 52 transactions (from P0 to P51), and searches for unique and/or repeating behavioral features. For example, the criminal user Adam moves the on-screen pointer between fields in a form by using the Tab key; this behavior is observed in transactions P0 and P51 (of user Adam), and is also observed in transactions P1 through P24 (of various legitimate users, who happen to also utilize the Tab key for moving between fields), but is not observed in transactions P25 through P50 (as those legitimate users did not user the Tab key to move between fields, but rather, used the computer mouse to move the on-screen pointer between fields). Therefore, the method of the present invention significantly narrows-down the original list of 52 transactions, that were performed at the same computer in the Public Library. Then, the method may proceed, for example, to examine the manner in which each transaction was "submitted". For example, in Transaction P0 of user Adam, the form was submitted by pressing the "Enter" key on the keyboard, rather than clicking via the mouse on the on-screen "submit" button. The system checks each one of the remaining candidate transactions (numbers P1 through P24 and also P51) for their submission method; and finds that: in transactions P1 through P8 and also P51, the form was submitted via the Enter key, whereas, in the remaining transactions (numbers P9 through P24) the form was submitted via a mouse-click on the Submit button; thereby enabling the system to further narrow-down the list of suspicious transactions to only 9 transactions (numbers P1 through P8, and P51).

The system may then proceed to further narrow-down the list based on other behavioral features that were extracted from the usage session of transaction P0, or that behaviorally characterized the utilization of the input-units of the computer during transaction P0. For example, the total time that it took criminal Adam to perform the initial transaction P0, was a relatively short period of time, such as 45 seconds (denoted L). The system examines the total time that it took to perform each one of the remaining suspicious transactions; and filters-out or removes suspicious transactions whose time-length was, for example, greater than 2 L or smaller than 0.5 L; thereby leaving only transactions P51 and P1 through P4 as possibly fraudulent.

Then, for example, the system detects that during the Initial Transaction P0, the user gestures have exhibited on-screen pointer movements that were all clock-wise; and the system proceeds to filter-out or remove candidate transactions in which the on-screen pointer movement were all counter-clockwise. Similarly, the system may detect that during the Initial Transaction, the user (Adam) has repeatedly clicked on the right-most region of each on-screen button that was used; and the system may thus filter-out and remove candidate transactions in which the user(s) repeatedly clicked on the left-most region of each on-screen button.

The system may thus continue to remove or filter-out or discard candidate transactions or usage-sessions, that originated from the same computer or IP address or geo-located venue, based on particular behavioral features that were extracted from tracking of the user-gestures in the Initial Transactions, and that were lacking from such other "linked" candidate transactions; thereby narrowing-down the list of related sessions or transactions from thousands to few transaction or even to a single transaction, thereby reducing the number of "false positive" errors or even avoiding entirely any "false positive" error. Furthermore, similar filtering-down or narrowing-down or discarding of candidate transactions, may similarly be performed with regard to second-order or third-order or Nth-order linkage among transaction.

Additionally or alternatively, the system may filter-out or discard or narrow-down transactions, based on criminally-related indicators and/or fraud-related indicators. For example, criminal Bob utilizes his laptop computer at a coffee shop to perform a fraudulent transaction at a particular online retailer. The system firstly identifies 500 other transactions that were performed during the same week at that same coffee shop. However, the system detects that in the Initial Transaction of Bob, the laptop utilized was accessing the retailer via a Virtual Private Network (VPN). This typically characterizes many fraudulent transactions; and typically characterizes few legitimate transactions. Therefore, the system may filter-in, or may keep, only linked transactions (that originated from the same venue or geo-location or IP address) in which a VPN was utilized; thereby filtering-out or discarding previously-tagged transactions that lacked VPN usage.

Further, the system detects that in the Initial Transaction, a particular Browser type and/or Browser version and/or Operating System (OS) were utilized by criminal Bob, which typically characterize fraudulent transactions and are less-likely features in legitimate transactions. The system may thus filter-in only flagged transactions that utilized the same browser type or browser version or OS, and may filter-out or discard previously-flagged transactions that were performed in the same venue by utilized other browser(s) and/or OS.

Furthermore, the system may filter-in only flagged transactions that exhibit one or more behavioral features that are known (or, that are pre-defined in the system) as being associated with criminal or fraudulent transactions; and this may be performed even if the Initial Transaction (P0) did not exhibit such behavioral feature(s). For example, the system may define that performing a copy-and-paste of the user's own name into an online form, is a fraud indicator; as most legitimate users typically type their name whereas many criminals utilize a copy-and-paste operation from a separate document of victim's data. Therefore, even if the Initial Transaction (P0) did not exhibit copy-and-paste of the user name, and exhibited manual typing of the user name, the system may proceed to filter-in linked transactions (e.g., originating from the save device or IP address or geo-location or venue as transaction P0; or shipping a product to the same destination address as transaction P0; or transferring funds to the same beneficiary as in transaction P0) that exhibit copy-and-paste of the user name.

Similarly, the system may filter-in only flagged transactions that exhibit one or more device features that are known (or, that are pre-defined in the system) as being associated with criminal or fraudulent transactions; and this may be performed even if the Initial Transaction (P0) did not exhibit such device feature(s). For example, the system may define that utilizing a TOR client or a VPN is a fraud indicator. Therefore, even if the Initial Transaction (P0) did not exhibit utilization of a VPN or of a TOR client, the system may still proceed to filter-in linked transactions (e.g., originating from the save device or IP address or geo-location or venue as transaction P0; or shipping a product to the same destination address as transaction P0; or transferring funds to the same beneficiary as in transaction P0) that exhibited utilization of a TOR client or a VPN.

For demonstrative purposes, some portions of the discussion herein may relate to detection of Fraud or Fraudulent Transactions, or for coloring or back-coloring or forward-coloring of fraud or fraudulent transactions; however, some embodiments of the present invention may similarly be utilized for detecting or coloring or analyzing other types of transactions, for example, illegal transactions, risky transactions, high-risk transactions, transactions that are related to money laundering, transactions that are related to terror activities or to terrorists or to terror funding, transactions that are related to gambling or illegal gambling, transactions that are related to pornography or to illegal pornography, transactions that are related to criminal offenses (e.g., sale or purchase of illegal drugs or illegal goods), transactions that are related to (or that utilize) a "mule" bank account, transactions that are related to currency offences or securities-related offenses or security trading offenses, or the like.

Reference is made to FIG. 1, which is a schematic block-diagram illustration of a system 100, in accordance with some demonstrative embodiments of the present invention. System 100 may comprise an electronic device 101 able to communicate with a remote server 102, over wired and/or wireless links or network(s), over the Internet, or over other suitable communications medium.

For demonstrative purposes, certain components are depicted as being implemented in electronic device 101, and are not depicted as part of remote server 102. However, this is only a non-limiting example; and embodiments of the present invention may implement the components of electronic device 101, or some of them, or all of them, also in remote server 102, in addition to (or instead of) being in electronic device 101.

Electronic device 101 may be, for example, a desktop computer, a laptop computer, a smartphone, a tablet, a smart-watch, a gaming console, a smart television, or other electronic device capable of communicating with a remote entity or remote server.

Remote server 102 may be or may comprise, for example, a web server, and application server, a cloud-computing server and/or repository and/or database, a server of a bank or banking entity, a server of a retailer or an online retailer or online vendor or online merchant, a server of an email provider or a social network service, or other suitable server which is capable of performing and/or facilitating a transaction that is submitted or entered or requested by the electronic device 101.

Remote server may comprise, for example, a Transactions Database 151 storing data and meta-data about transactions (e.g., banking transactions, electronic commerce transactions). A Transactions Selector Unit 152 may operate to select transactions from the Transactions Database, based on one or more selection rules or queries; for example, selecting transactions that were performed or submitted from a particular IP address, or device, or device MAC address, or that have a particular shipping name or shipping address, or that have a particular billing name or billing address, or that have a particular beneficiary name or beneficiary address, or the like.

Electronic device 101, as well as server 102, may comprise suitable hardware components and/or software components, such as: a processor, a memory unit, a storage unit, one or more input units (e.g., mouse, touch-screen, touch-pad, physical keyboard, on-screen keyboard, physical keypad, on-screen keypad), one or more output units (e.g., display unit, screen, monitor, touch-screen, audio speakers), a power source (e.g., internal battery, external battery, rechargeable battery, connection to mains power), communication means (e.g., Wi-Fi transceiver, Bluetooth transceiver, cellular transceiver, Network Interface Card (NIC), wired or wireless modem), an Operating System (OS), drivers, applications, or the like.

Device 101 may further comprise, for example: an accelerometer 111 able to measure or sense acceleration of device 101; as well as one or more gyroscopes 112 or compass units 113 or other device-orientation sensors 114 able to sense spatial orientation or tilt or slanting of the device 101 or its spatial positioning relative to the ground.

A user-gestures tracking unit 115 may track, monitor and log the user-gestures performed by a user of device 101 on the entirety of the device (e.g., rotating the device, lifting it, tilting it, spinning it, or the like) and/or on an input unit of the device (e.g., tapping or double-tapping on the touch-screen; moving the mouse; clicking the mouse; dragging a finger on the touch-pad; clicking the touch-pad; scrolling the mouse-wheel; or the like). Such user-gestures may be logged, with their time-stamp/date-stamp (e.g., a keypress of the character "H" occurred at a certain time and date), as well as with contextual or context-based information associated with each user-gesture (for example, a keypress of the character "H" occurred during filling-out of the Beneficiary field in a wire transfer request form; a tap on the on-screen keyboard of the letter "K" occurred during entry of a recipient address; a paste operation (CTRL-V) occurred within data-entry in a Username field; or the like).

A user-interactions tracking unit 116 may track, monitor and log the particular interactions that the user performs, without necessarily relating them to the particular input-unit that was used. For example, the unit may track and log that a "submit form" interaction was performed at a certain date and time, in a certain context (e.g., in a "wire transfer request" form), regardless of whether the form was submitted by pressing the Enter key on the keyboard or by clicking on the on-screen Submit button via the computer mouse or via the touch-pad.

A behavioral characteristics detector 117 may analyze the tracked user interactions and user-gestures, and may deduce or extract or detect one or more particular behavioral characteristics that characterize the gestures and interactions of each user or each usage-session or each transaction. For example, transaction P1 performed by user U1 may exhibit the following behavioral characteristics: the entire transaction took 44 seconds from start to finish; the form was submitted by pressing the Enter key; the family name was pasted and not manually typed; the movement among fields in the form was by using the Tab key; the screen was scrolled down using the scroll-wheel of a mouse (and not via the keyboard cursor keys, and not by dragging the scroll bar at the margin of the screen); or the like. Such set of behavioral characteristics may be recorded as being associated with the interactions and gestures that were part of that transaction P1 of user U1. For demonstrative purposes, behavioral characteristics detector 117 is shown as part of remote server 102; for example, operating on data that was transmitted or uploaded from device 101; although in other embodiments, behavioral characteristics detector 117 may be implemented (additionally or alternatively) as part of device 101.

A device properties tracking unit 118 may track, monitor and log the properties of the device 101 itself, during the transaction and/or during particular segments of the transaction. For example, it may record and log that during 90 percent of the duration of the transaction P1 of user U1, the entirety of device 101 was held generally parallel to the ground; during the two seconds of the Submit operation, the device was slanted at 30 degrees relative to the ground; the device was accelerated upwardly during the scrolling of the screen; or the like. Such data may be sensed by, measured by, and collected from the relevant units of the device, for example, the device orientation sensors, gyroscope, compass unit, accelerometer, or the like.

A device characteristics detector 119 may analyze the tracked device properties, and may deduce or extract or detect one or more particular characteristics or sets of characteristics, that characterize the specific device and its spatial properties during (and/or immediately before and/or immediately after) gestures and interactions of each user or each usage-session or each transaction. For example, transaction P1 performed by user U1 may exhibit the following device characteristics: during the filling-out of 90% of the online form, the device was horizontal and parallel to the ground; during the filling out of the family name, the device was vertical and perpendicular to the ground; during the pressing of the Submit on-screen button, the device was slanted at 30 degrees relative to the ground and was also rotated 20 degrees counterclockwise during that touch on the touch-screen. Such set of device characteristics may be recorded as being characteristic of the particular device in conjunction with the interactions and gestures that were part of that transaction P1 of user U1. For demonstrative purposes, device characteristics detector 119 is shown as part of remote server 102; for example, operating on data that was transmitted or uploaded from device 101; although in other embodiments, device characteristics detector 119 may be implemented (additionally or alternatively) as part of device 101

A fraud indicators detector 120 may analyze the tracked user interactions and user-gestures, and may deduce or extract or detect one or more particular behavioral characteristics that are pre-defined in the system as typically characterizing fraudulent transactions and/or criminal transactions, and/or as typically lacking from legitimate non-fraudulent transactions or usage sessions. Such indicators may be, for example: the entire time-period for filling out the form and submitting it is shorter than T seconds (wherein T is a pre-defined threshold value, such as 30 seconds); the First Name, or the Family Name or the zip code, of the user or of the beneficiary or of the shipping name or the billing name or the credit card holder were pasted and not typed manually character by character; the transaction was performed via a VPN connection, or while a TOR client was running; the time or the time-zone of the device (e.g., as queried by the browser) does not match the time or the time-zone that is expected based on geo-location by the IP address (e.g., the IP address indicates geo-location to Russia; but the time or time-zone as queried by the browser or application return a United States time or time zone); or the like.

Optionally, a User Expertise Estimator 121 may operate to deduce or estimate a level of computer savviness or level of expertise of a user associated with a transaction. For example, filling out the entire form in less than T seconds may contribute 1 point of computer savviness; using the Tab key to move among fields in the form may contribute an additional 1 point of computer savviness; using a paste operation (e.g., CTRL-V) in two or more fields may contribute an additional 1 point of computer savviness; submitting a form via the Enter key rather than using a mouse-click may contribute additional two points; using Shift-Tab to go back to a previous field in the same form may contribute 4 additional points (e.g., being a rare and less-known keyboard shortcut); utilizing a Linux operating system may contribute 2 points of computer savviness; and so forth. A user-expertise lookup table (or, a computer savviness lookup table) may be used, with threshold values or ranges-of-values, to correlate between cumulative points and the matching level of expertise or level of computer savviness. For example, a transaction or usage-session that accumulated 10 or more points of computer savviness, may be assigned a High level of computer savviness; whereas, a transaction or usage-session that accumulated 5 to 9 points of computer savviness, may be assigned a Medium level of computer savviness; whereas, a transaction or usage-session that accumulated 0 to 4 points of computer savviness, may be assigned a Low level of computer savviness. In some embodiments, for example, the Initial Transaction (P0) may have a High level of computer savviness; and therefore, the system may enforce a pre-defined rule that discards all possibly-fraudulent transactions, that were linked in one way or another to P0 (e.g., based on same device, or same IP address, or same geo-location venue, or same shipping address, or same beneficiary name, or the like), if such other transactions have a Low level of computer savviness; or, in some embodiments, if such transactions have either Low or Medium level of computer savviness (since the Initial Transaction P0 had a High level).

In other embodiments, the level of expertise or computer savviness may be utilized even without necessarily relying on that of the Initial Transaction P0; for example, if an Initial Transaction P0 is associated with a Medium level of computer savviness, and the system generates an initial list of 20,000 possibly linked transactions (e.g., based on same device, or same IP address, or same geo-location venue, or same shipping address, or same beneficiary name, or the like), then the system may perform a first narrowing-down or filtering iteration in which all candidate transactions that have Low or Medium level of computer savviness are discarded (even though P0 had a Medium level), in order to reduce significantly the number of possible candidates and to enable the system to focus on the candidate transactions that have a High level of computer expertise.

In some embodiments, optionally, the system may perform a filtering-in process of candidate transactions, based on a mismatch between (i) the estimated level of computer savviness associated with a particular transaction (e.g., transaction P5) based on analysis of tracked user-gestures and user interactions, and (ii) the estimated level of computer savviness associated with that transaction based on age or age-range that is known to the system. For example, Initial Transaction P0 may be linked to hundreds of other possibly-fraudulent transactions, one of them being Transaction P5. The system detects that the level of computer savviness, that is deduced from user-gestures and user-interactions in Transaction P5, match a High level of computer savviness (e.g., having 17 points of computer savviness); however, the system also detects that Transaction P5 is performed by a bank customer which the system already knows to have a date-of-birth indicating that the customer is 83 years old, which typically has Low or Medium (and not High) level of computer savviness. The system may thus detect and declare a Mismatch between those two parameters, and this may be a trigger to keep Transaction P5 in the list of fraud candidate transactions, and to avoid discarding Transaction P5 from that list; or may further cause the system to generate a separate notification alert regarding such mismatch as a stand-alone fraud indicator that warrants blocking of the transaction or the relevant account until further review.

In some embodiments, an Initial Transaction Feeder 122 (or a Seed Transaction feeder) may receive as input, a pointer or indicator or transaction-number of the Initial Transaction or the Seed Transaction (transaction P0) which is known to be fraudulent. Such input may be fed manually into the system via a fraud investigator; and/or may be fed automatically or semi-automatically (e.g., based on a credit card dispute submitted by a genuine logged-in user who submitted a statement that Transaction P0 was fraudulent and he never performed or authorized it).

A Related-Transactions List Generator 123 may operate to generate a first-order list of transactions that are possibly related to the Initial Transaction. For example, it may search all the transactions that were performed in the past 12 months before the Initial Transaction, or in the 8 months that preceded and the 7 months that followed the Initial Transaction, and had one or more common properties with the Initial Transaction; such as, same IP address, same device identifier, same device MAC address, same "cookie" data-item, same shipping address, same billing address, same beneficiary name or account number or address, same customer name or address, same geo-location of the IP address, same location or venue, or the like.

Then, an Iterative List Expander 124 may utilize the initial List of Related Transactions, feeding each transaction on the initial list as a new input into the Related-Transactions List Generator 123; thereby generating a second-order list of related transactions (e.g., twice removed from the original Initial Transaction P0). The Iterative List Expander 124 may repeat the process for N times or N iterations, N being a pre-defined number of iterations (e.g., five iterations), to generate a list which may have thousands or even millions of related transactions, that are N-times removed relative to the original Initial Transaction P0.

Accordingly, the system of the present invention may perform an iterative process of link analysis and/or transaction analysis and/or usage-session analysis, which iterative expands or grows the list or tree or web of related transactions or usage-sessions, and repeat itself as long as some transactions have common elements with previously-flagged transactions; and in some embodiments, only if such additional transactions feature one or more fraud-related indicators exhibited via negative behavioral characteristics. The list expansion is performed by adding incoming transactions as they are received by the system (e.g., upon their submission by users), and/or by going backwards and searching the database of transactions for past transactions (which had occurred prior to an already-flagged transaction; or which occurred subsequent to an already-flagged transaction), thereby performing a continuous back-looking and forward-looking search and flagging of transactions.

In accordance with the iterative behaviorally-validated link analysis or session analysis or transaction analysis or fraud detection process of the present invention, once a new transaction is recorded or received or submitted to the system, the process checks (i) whether one or more of the transaction elements are the same as those of another transaction that already appears in any already-flagged transaction on the current link analysis list, and further checks (ii) whether the new transaction demonstrates one or more behavioral characteristics that are pre-defined in the system as being fraud-related or as being risk factors (e.g., in the fresh transaction, the user pasted his first name instead of typing it manually); and upon positive results of these checks, the process adds the new transactions to the list of fraud candidates; and all of its elements that might be potentially linked to other transactions are checked and analyzed: those that have already been recognized before as known to be fraud-related may be ignored, while elements that are new and were not yet used (e.g. the usage-session of the fresh transaction was performed by the same end-device as an already-flagged transaction on the list, but the IP address of the fresh transaction was not seen in any other transaction on the list are then added as fraud candidates and are utilized for further iterative linking and coloring, searching back in the transaction history to find all transactions that were submitted from that new IP address of the new transaction (and which also exhibited at least one behavioral characteristic that is pre-defined as risky behavior or as fraud-related). Then, in an iterative manner, the process analyzes the elements of those newly-added transactions, to further expand the list and to grow the list or tree or web of fraud-candidate transactions or usage-sessions.

A List Filtering Unit 125 may then operate on the generate list, to filter-out (discard, remove, delete) certain transactions and/or to filter-in (keep, maintain) certain other transactions, based on one or more pre-defined Filtering Rules 126. Optionally, a Filtering-Out Unit 125A may be responsible for performing filtering-out (discarding) of candidate transactions; whereas, a Filtering-In Unit 125B may be responsible for performing filtering-in (keeping) of candidate transactions.

For example, the enforcement of the filtering rules may cause the system to keep only candidate transactions that exhibit the same behavioral characteristics and/or device properties that were identified in the Initial Transaction P0; and to discard candidate transactions that do not exhibit those. Additionally or alternatively, the filtering rules may enforce filtering-in and keeping candidate transactions that exhibit criminal indictors or fraud-related indicators, and filtering-our or discarding of transactions that lack any criminal indicators or fraud-related indicators.

A Filtered List Generator 127 may then output a filtered list, which is shorter or significantly shorter relative to the initial list(s), which now reflects linked transactions and/or linked sessions and/or back-colored transactions and/or forward-colored transactions that are estimated to have High Probability of being fraudulent.

The Filtered List may be transferred to a Fraud Mitigation Unit 128 or other module or component, which may perform one or more operations, such as: generating and sending notification(s) to the user and/or account owner and/or bank and/or retailer and/or merchant and/or credit card company; flagging a transaction and/or an account as Fraudulent; blocking or suspending or freezing a transaction or an account or a user; reversing a transaction, canceling a transaction, modifying a transaction; requiring a user (e.g., via email, text message email) to contact a customer service representative or a fraud department in order to authenticate and to approve or dispute a transaction; triggering a two-factor or multi-factor authentication with regard to a transaction or an account; sending a notification to a law enforcement agency or a loss prevention department; or the like.

In some embodiments, the filtering of linked transaction may be performed retroactively or in retrospect, with regard to already-performed or already-submitted transactions, that were submitted and/or performed hours or days or even months before the Initial Transactions; thereby back-coloring certain past transaction as fraudulent, based on their relation to an Initial Transaction that was recently determined to be fraudulent. In other embodiments, forward-coloring may be performed by the system; for example, the system operates on July 1, and determines that an Initial Transaction that occurred on June 14 was fraudulent; the system may perform back-coloring of related transactions performed before June 14, and the system may perform forward-coloring of related transactions performed after June 14, based on the relation of those transactions to the Initial Transaction of June 14, and while enforcing the filtering-in and filtering-out rules as described. In some embodiments, optionally, the system may operate in real-time or in near-real-time; such that, for example, a fresh transaction is submitted (e.g., a fresh wire transfer request towards a banking website); the fresh transaction is immediately determined to be fraudulent (e.g., since the beneficiary name and address appear in a pre-defined black-list of known criminals); then, immediately, a database of past transactions is searched for related past transactions, that feature one or more similarities to the fresh transaction (e.g., same IP address, same device, same paying entity, same amount, same textual description of the wire transfer, same geo-location or venue, or the like); then, a rapid analysis is performed, in near-real-time, of the behavioral characteristics and device properties and fraud indicators of the fresh transaction; and filtering-in and filtering-out is performed rapidly by the system with regard to related past transactions; thereby enabling the system to generate, within few seconds of blocking a fresh fraudulent transaction, a filtered concise list of past transactions that are similarly estimate to be fraudulent.

In some embodiments, the tracking and/or monitoring and/or recording and/or logging of user-gestures and/or user interactions and/or device properties, may be performed or implemented by utilizing client-side/device-side components or modules or units, and/or server-side components or modules or units, and/or based on a combination thereof. For example, in some embodiments, an application or "app" or "mobile app" of a bank or an online retailer, may be implemented to comprise a client-side module or code or program that tracks and logs user-gestures and user interactions and device properties (e.g., recording keystrokes, screen taps, device tilting, device acceleration, or the like); and such collected data may then be stored and/or analyzed locally within the end-device itself, and/or may be transmitted or uploaded to a remote server for remote storage and/or analysis there. In other embodiments, the tracking and logging functionality may be built-in into a smartphone or tablet, or may be part of an Operating System, to provide a secure or a more secure user experience that protects users against fraudulent transactions in their accounts; for example, legitimate user Charles may concur that his smartphone and/or his banking application would track his user-gestures and interactions, in order to better protect his bank account against fraudulent transactions by third party attackers. In other embodiments, the tracking and logging may be implemented via program code, such as using HTML5 and/or JavaScript and/or CSS, which may be injected or inserted or embedded into a web-page or web-site (e.g., a banking website), thereby performing such client-side tracking and monitoring; and optionally also uploading or sending the recorded data to a remote server for further storage and/or analysis there. In some embodiments, additionally or alternatively, some functionalities may be implemented as using server-side components or architecture; for example, a "Submit" button may be originally served to the browser as a set of three button-parts, thereby enabling the remote server to detect by itself whether the user clicked on the right side or the left side or the middle side of the Submit button, thereby enabling the server to later perform session linking and/or back-coloring and/or forward-coloring by taking into account the region within the Submit button that was tapped or clicked. In other embodiments, some functionalities may be integrated into a web browser, or may be part of a browser extension or plug-in or add-on; or may be a stand-alone software application or a companion application (similar to the way that an anti-virus application is a stand-alone application that provides auxiliary protection). Other suitable implementations may be used.

In some embodiments, a Population Scarcity Unit 129 may optionally operate to ensure that the system utilizes only behavioral characteristics and/or device features and/or fraud-related features, that are relatively rare or scarce (e.g., below a pre-defined threshold value or ratio) in the general population of users, or in the general population of legitimate users (e.g., associated with a pool of past transactions that are known to be legitimate or non-fraudulent; since, for example, they occurred N years ago and were not disputed by any customer). In a first example, the system may detect that during the submission of the Initial Transaction (P0), the criminal user had moved the on-screen pointer in curved counter-clockwise motions when moving from field to field in the form; however, the system may also know, based on data collected from tracking user-gestures across numerous (e.g., thousands, or tens-of-thousands) of legitimate sessions, that such movement characterizes 45 percent of users in the general population; therefore, the system may determine that this feature, which is still unique to the criminal that performed the Initial Transaction, would not be utilized as a differentiator or as a filtering rule for deciding whether a candidate-fraud transaction should be maintained or discarded, since the Scarcity or Rareness of this behavioral feature is beyond a pre-defined threshold value; for example, the system may be configured to utilize only behavioral features that appear in N percent or less of the general population of users, such as, 15 or 10 or 5 percent or less of the general population of users. In a second example, the system may determine that the Initial Transaction (P0) was performed by the Opera web browser on a Linux operating system; and that this combination of browser type and OS type characterizes only two percent of the general population of legitimate users; and that this combination of browser type and OS type characterizes 34 percent of fraudulent transactions; and therefore, the system may determine to indeed utilize this combination of device features in order to filter-in candidate-fraud transactions that exhibit them. In contrast, if the Initial Transaction was submitted via a Chrome web browser on Microsoft® Windows® operating system, then the system may determine not to utilize this combination of features as a filtering rule, since they are known by the system to be non-rare or non-scarce in the general population of users, or since they are not sufficiently rare to enable reliable reliance on them.

In some embodiments, the behavioral-validated filtering or selecting of transactions, may be performed, for example, by filtering-in only transactions that feature one or more behavioral characteristics that are a-prior defined in the system (e.g., in a list of rules, or a lookup table) as being Frequent among the population of hackers or criminals or "fraudsters" or fraudulent transactions (e.g., known to characterize at least N1 percent of that population and/or of transactions that are Known to be fraudulent; such as, appearing in at least 50 or 25 percent), and at the same time, are a-priori defined in the system (e.g., in a list of rules, or a lookup table) as being Rare or Scarce among the population of legitimate users and/or legitimate transactions (e.g., known to characterize not more than N2 percent of that populations and/or of transactions that are Known to be legitimate, such as, appearing in no more than 5 or 7 percent of such transactions). For example, the characteristic of "utilization of Linux" may not be sufficiently rare in the population of legitimate users or legitimate transactions, and thus may Not be utilized By Itself as a filtering rule; however, the Combined set of characteristics of, for example, "utilization of Linux, and also utilization of Firefox browser version 64, and also utilization of a VPN, and also utilization of a TOR client", may be defined in the system as a-priori characterizing 36 percent of fraudulent transactions yet also characterizing only 1 percent of legitimate users; and therefore this Set of Characteristics may be used as a filtering rule. In another example, performing a Paste operation of the Family Name of the user, together with using a keyboard shortcut of Shift+Tab to move the on-screen cursor to a previous on-screen field, may be defined by the system as a-priori being associated with fraudulent transactions and not with legitimate transaction; Not because 90% of hackers or fraudsters do it, but rather, because the system may had already observed that in 98 of the transactions in which those characteristics were detected, it was determined that the transaction was fraudulent; whereas, in only 2 percent of the transactions in which those characteristics were detected, it was determined that the transaction was legitimate. Therefore, the Scarcity or Frequency of a set of characteristics, need not necessarily be checked relative to the general population of users (legitimate or fraudulent); but rather, may be checked against a pre-defined lookup table that indicates that a particular characteristic, or a particular Set of Characteristics, that had been detected in 100 transactions, was such that 99 of those 100 transactions were fraudulent; and therefore this characteristic or this set of characteristics is suitable for basing behavioral-validation filtering (or discarding) of transactions.

In some embodiments, a method comprises: (a) receiving an indicator of a seed transaction known to be fraudulent; (b) selecting, from a database of transactions, multiple transactions that share at least one common property with said seed transaction; and generating a list of candidate fraudulent transactions; (c) filtering the candidate fraudulent transactions, by applying a transaction filtering rule that is based on one or more behavioral characteristics; and generating a filtered list of candidate fraudulent transactions. In some embodiments, step (b) may be optional, such that the system may be pre-provided with a Single seed transaction that is known to be fraudulent, and with a Group of candidate transactions that may or may not be fraudulent; and then, behavioral-validation filtering of such transactions may be performed, to generate a Subset from that original Group of transactions.

In some embodiments, the filtering of claim (c) comprises: (c1) determining a behavioral characteristic that characterized user-gestures during entry of said seed transaction; (c2) filtering-out from said list of candidate fraudulent transactions, one or more candidate fraudulent transactions that lack said behavioral characteristic.

In some embodiments, the filtering of claim (c) comprises: (c1) determining a behavioral characteristic that characterized user-gestures during entry of said seed transaction; wherein said behavioral characteristic indicates that a user of the seed transaction utilized a particular keyboard shortcut for data-entry during the seed transaction; (c2) filtering-out from said list of candidate fraudulent transactions, one or more candidate fraudulent transactions that lack said behavioral characteristic.

In some embodiments, the filtering of claim (c) comprises: (c1) determining a behavioral characteristic that characterized user-gestures during entry of said seed transaction; wherein said behavioral characteristic indicates that a user of the seed transaction utilized a particular way for submitting an online form during the seed transaction; (c2) filtering-out from said list of candidate fraudulent transactions, one or more candidate fraudulent transactions that lack said behavioral characteristic.

In some embodiments, the filtering of claim (c) comprises: (c1) determining a behavioral characteristic that characterized user-gestures during entry of said seed transaction; wherein said behavioral characteristic indicates that a user of the seed transaction utilized a particular way for moving between fields of an online form during the seed transaction; (c2) filtering-out from said list of candidate fraudulent transactions, one or more candidate fraudulent transactions that lack said behavioral characteristic.

In some embodiments, the filtering of claim (c) comprises: (c1) determining spatial device properties that characterized an electronic device during entry of said seed transaction through said electronic device; (c2) filtering-out from said list of candidate fraudulent transactions, one or more candidate fraudulent transactions that do not exhibit said spatial device properties.

In some embodiments, the filtering of claim (c) comprises: (c1) determining spatial device-acceleration properties that characterized an electronic device during entry of said seed transaction through said electronic device; (c2) filtering-out from said list of candidate fraudulent transactions, one or more candidate fraudulent transactions that do not exhibit said spatial device-acceleration properties.

In some embodiments, the filtering of claim (c) comprises: (c1) determining spatial device-orientation properties that characterized an electronic device during entry of said seed transaction through said electronic device; (c2) filtering-out from said list of candidate fraudulent transactions, one or more candidate fraudulent transactions that do not exhibit said spatial device-orientation properties.

In some embodiments, the filtering of claim (c) comprises: (c1) determining that user-gestures in said seed transaction, exhibited a first behavioral characteristic and a second behavioral characteristic; (c2) determining that the first behavioral characteristic that was exhibited in the seed transaction, is sufficiently scarce in the general population of users, based on a pre-defined threshold value of scarcity; (c3) determining that the second behavioral characteristic that was exhibited in the seed transaction, is not sufficiently scarce in the general population of users, based on the pre-defined threshold value of scarcity; (c4) performing filtering of candidate fraudulent transactions, based only on said first behavioral characteristic which is sufficiently scarce, and not based on said second behavioral characteristic that is not sufficiently scarce.

In some embodiments, the filtering of claim (c) comprises: (c1) determining that device properties in said seed transaction, exhibited a first device-characteristic and a second device-characteristic; (c2) determining that the first device-characteristic that was exhibited in the seed transaction, is sufficiently scarce in the general population of users, based on a pre-defined threshold value of scarcity; (c3) determining that the second device-characteristic that was exhibited in the seed transaction, is not sufficiently scarce in the general population of users, based on the pre-defined threshold value of scarcity; (c4) performing filtering of candidate fraudulent transactions, based only on said first device-characteristic which is sufficiently scarce, and not based on said second device-characteristic that is not sufficiently scarce.

In some embodiments, the filtering of claim (c) comprises: (c1) analyzing user-gestures that were collected during said seed transaction, and detecting a particular set of behavioral features that are pre-defined as characterizing fraudulent usage-sessions; (c2) filtering-in said list of candidate fraudulent transactions, to maintain therein only candidate fraudulent transactions that exhibit said particular set of behavioral features.

In some embodiments, the filtering of claim (c) comprises: (c1) analyzing session properties that characterized a usage-session in which said seed transaction was entered; and detecting a particular set of device properties that are pre-defined as characterizing fraudulent usage-sessions; (c2) filtering-in said list of candidate fraudulent transactions, to maintain therein only candidate fraudulent transactions that exhibit said particular set of device properties.

In some embodiments, the method comprises: based on a table of pre-defined fraud indicators, that characterize online behavior of users that perform fraudulent activity, filtering-out from said list of candidate fraudulent transactions, one or more candidate transactions that lack any pre-defined fraud indicator other than being related to said seed transaction.

In some embodiments, the method comprises: filtering-out, from said list of candidate fraudulent transactions, one or more candidate fraud transactions whose user-gestures exhibit a level of computer savviness that is smaller than a pre-defined threshold value.

In some embodiments, the method comprises: based on analysis of user-gestures and user interactions of said seed transaction, determining a level of computer savviness of a user that performed said seed transaction; filtering-out, from said list of candidate fraudulent transactions, one or more candidate fraud transactions that exhibit a level of computer savviness that is smaller than said level of computer savviness that said user exhibited in said seed transaction.

In some embodiments, the selecting of step (b) comprises: iteratively expanding said list of candidate fraudulent transactions, by selecting from said database of transactions, an additional transaction that shares with said seed transaction at least one of: same Internet Protocol (IP) address, same device, same MAC address, same cookie, same beneficiary, same shipping address, same billing address, same first name and same family name, same geo-location venue.

In some embodiments, the selecting of step (b) comprises: iteratively expanding said list of candidate fraudulent transactions, by selecting from said database of transactions, an additional transaction that shares with said seed transaction at least one of: same Internet Protocol (IP) address, same device, same MAC address, same cookie, same beneficiary, same shipping address, same billing address, same first name and same family name, same geo-location venue; wherein said additional transaction is added to said list of candidate fraudulent transactions only if a usage-session of said additional transaction comprises at least one behavioral characteristic that is pre-defined as being fraud-related.

In some embodiments, the selecting of step (b) comprises: iteratively expanding said list of candidate fraudulent transactions, by selecting from said database of transactions, an additional transaction that shares with said seed transaction at least one of: same Internet Protocol (IP) address, same device, same MAC address, same cookie, same beneficiary, same shipping address, same billing address, same first name and same family name, same geo-location venue; wherein said additional transaction is added to said list of candidate fraudulent transactions only if a usage-session of said additional transaction comprises at least one behavioral characteristic that was also extracted from the usage-session of the seed transaction.

In some embodiments, the selecting of step (b) comprises: iteratively expanding said list of candidate fraudulent transactions, by selecting from said database of transactions, an additional transaction that shares with said seed transaction at least one of: same Internet Protocol (IP) address, same device, same MAC address, same cookie, same beneficiary, same shipping address, same billing address, same first name and same family name, same geo-location venue; wherein said additional transaction is added to said list of candidate fraudulent transactions only if a usage-session of said additional transaction comprises at least one device-usage property that is pre-defined as being fraud-related.

In some embodiments, the method comprises: iteratively expanding said list of candidate fraudulent transactions, by performing: back-coloring of transactions, that occurred prior to said seed transactions, as behaviorally-validated prior fraudulent transactions; and forward-coloring of transactions, that occurred subsequent to said seed transactions, as behaviorally-validated subsequent fraudulent transactions.

In some embodiments, the method comprises: iteratively expanding said list of candidate-fraud transactions; and iteratively filtering expanded lists of candidate-fraud transactions by applying behavioral validation rules.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device. In some embodiments, a method comprises: (a) monitoring user interactions of a user that Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings, or even if they are depicted in any drawing(s) without necessarily being connected via a line or an arrow.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   (a) receiving by a computerized device an indicator of a seed transaction known to be fraudulent;
   (b) selecting, from a database of transactions, multiple transactions that share at least one common property with said seed transaction; and generating a list of candidate fraudulent transactions;
   (c) filtering the candidate fraudulent transactions, by applying a transaction filtering rule that is based on one or more behavioral characteristics; and generating a filtered list of candidate fraudulent transactions;
   wherein the method is implemented by at least a hardware processor;
   wherein the filtering of claim (c) comprises:
   (c1) determining that user-gestures in said seed transaction, exhibited a first behavioral characteristic and a second behavioral characteristic;
   (c2) determining that the first behavioral characteristic that was exhibited in the seed transaction, is sufficiently scarce in the general population of users, based on a pre-defined threshold value of scarcity;
   (c3) determining that the second behavioral characteristic that was exhibited in the seed transaction, is not sufficiently scarce in the general population of users, based on the pre-defined threshold value of scarcity;
   (c4) performing filtering of candidate fraudulent transactions, based on said first behavioral characteristic which is sufficiently scarce, and not based on said second behavioral characteristic that is not sufficiently scarce.

2. The method of claim 1, comprising:
   based on a table of pre-defined fraud indicators, that characterize online behavior of users that perform fraudulent activity, filtering-out from said list of candidate fraudulent transactions, one or more candidate transactions that lack any pre-defined fraud indicator other than being related to said seed transaction.

3. The method of claim 1, further comprising:
   filtering-out, from said list of candidate fraudulent transactions, one or more candidate fraud transactions whose user-gestures exhibit a level of computer savviness that is smaller than a pre-defined threshold value.

4. The method of claim 1, further comprising:
   based on analysis of user-gestures and user interactions of said seed transaction, determining a level of computer savviness of a user that performed said seed transaction;
   filtering-out, from said list of candidate fraudulent transactions, one or more candidate fraud transactions that exhibit a level of computer savviness that is smaller than said level of computer savviness that said user exhibited in said seed transaction.

5. The method of claim 1, wherein the selecting of step (b) comprises:
   iteratively expanding said list of candidate fraudulent transactions, by selecting from said database of transactions, an additional transaction that shares with said seed transaction at least one of:
   same Internet Protocol (IP) address,
   same device,
   same MAC address,
   same cookie,
   same beneficiary,
   same shipping address,
   same billing address,
   same first name and same family name,
   same geo-location venue.

6. The method of claim 1, wherein the selecting of step (b) comprises:
   iteratively expanding said list of candidate fraudulent transactions, by selecting from said database of transactions, an additional transaction that shares with said seed transaction at least one of:
   same Internet Protocol (IP) address,
   same device,
   same MAC address,
   same cookie,
   same beneficiary,
   same shipping address,
   same billing address,
   same first name and same family name,
   same geo-location venue;
   wherein said additional transaction is added to said list of candidate fraudulent transactions only if a usage-session of said additional transaction comprises at least one behavioral characteristic that is pre-defined as being fraud- related.

7. The method of claim 1, wherein the selecting of step (b) comprises:
   iteratively expanding said list of candidate fraudulent transactions, by selecting from said database of transactions, an additional transaction that shares with said seed transaction at least one of:
   same Internet Protocol (IP) address,
   same device,
   same MAC address,
   same cookie,
   same beneficiary,
   same shipping address,
   same billing address,
   same first name and same family name,
   same geo-location venue;
   wherein said additional transaction is added to said list of candidate fraudulent transactions only if a usage-session of said additional transaction comprises at least one behavioral characteristic that was also extracted from the usage-session of the seed transaction.

8. The method of claim 1, wherein the selecting of step (b) comprises:
   iteratively expanding said list of candidate fraudulent transactions, by selecting from said database of transactions, an additional transaction that shares with said seed transaction at least one of:
   same Internet Protocol (IP) address,
   same device,
   same MAC address,
   same cookie,
   same beneficiary,
   same shipping address,
   same billing address,
   same first name and same family name,
   same geo-location venue;
   wherein said additional transaction is added to said list of candidate fraudulent transactions only if a usage-session of said additional transaction comprises at least one device-usage property that is pre-defined as being fraud-related.

9. The method of claim 1, comprising:

iteratively expanding said list of candidate fraudulent transactions, by performing:

back-coloring of transactions, that occurred prior to said seed transactions, as behaviorally-validated prior fraudulent transactions; and forward-coloring of transactions, that occurred subsequent to said seed transactions, as behaviorally-validated subsequent fraudulent transactions.

10. The method of claim 1, comprising:

iteratively expanding said list of candidate-fraud transactions; and iteratively filtering expanded lists of candidate-fraud transactions by applying behavioral validation rules.

11. A system comprising:

one or more hardware processors, operably associated with one or more memory units, wherein the one or more hardware processors are configured to:

(a) receive an indicator of a seed transaction known to be fraudulent;

(b) select, from a database of transactions, multiple transactions that share at least one common property with said seed transaction; and generate a list of candidate fraudulent transactions;

(c) filter the candidate fraudulent transactions, by applying a transaction filtering rule that is based on one or more behavioral characteristics; and generate a filtered list of candidate fraudulent transactions; by said one or more processors being configured to:

(c1) determine that user-gestures in said seed transaction, exhibited a first behavioral characteristic and a second behavioral characteristic;

(c2) determine that the first behavioral characteristic that was exhibited in the seed transaction, is sufficiently scarce in the general population of users, based on a pre-defined threshold value of scarcity;

(c3) determine that the second behavioral characteristic that was exhibited in the seed transaction, is not sufficiently scarce in the general population of users, based on the pre-defined threshold value of scarcity;

(c4) perform filtering of candidate fraudulent transactions, based only on said first behavioral characteristic which is sufficiently scarce, and not based on said second behavioral characteristic that is not sufficiently scarce.

* * * * *